Feb. 2, 1960
L. M. NEUERT
2,923,804
SAFETY ELECTRIC KETTLE
Filed April 25, 1958
2 Sheets-Sheet 2
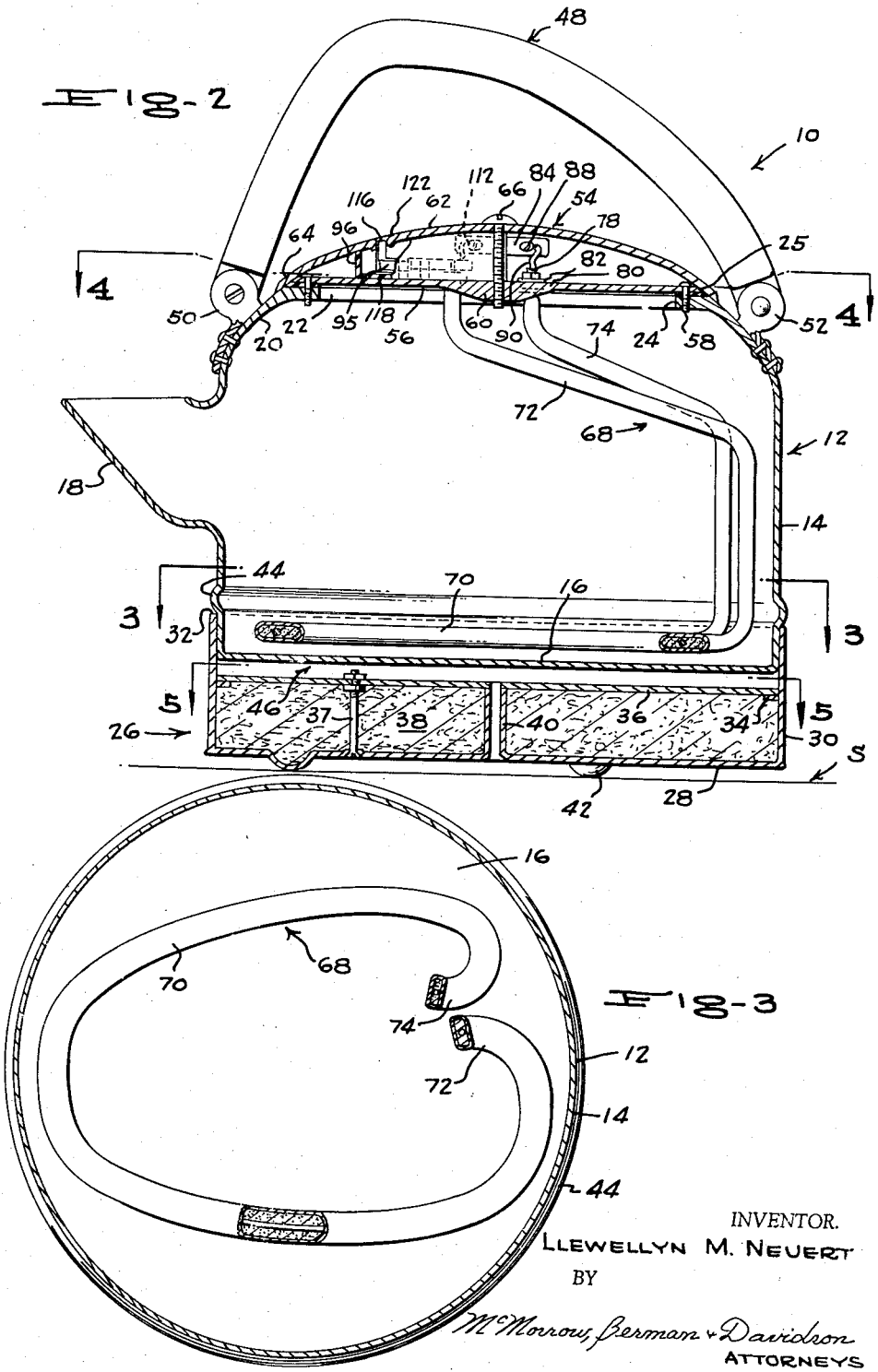
INVENTOR.
LLEWELLYN M. NEUERT
BY
McMorrow, Berman & Davidson
ATTORNEYS

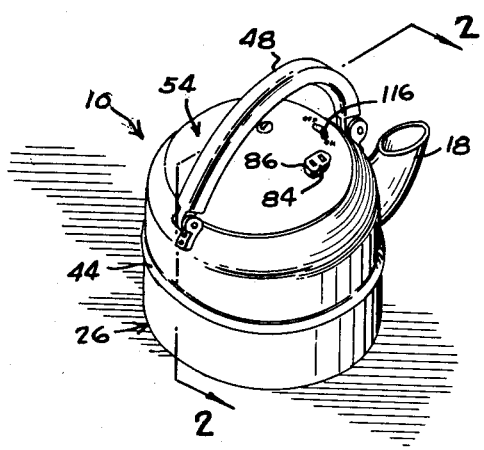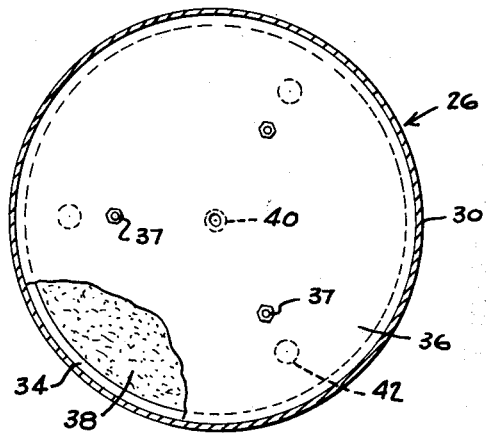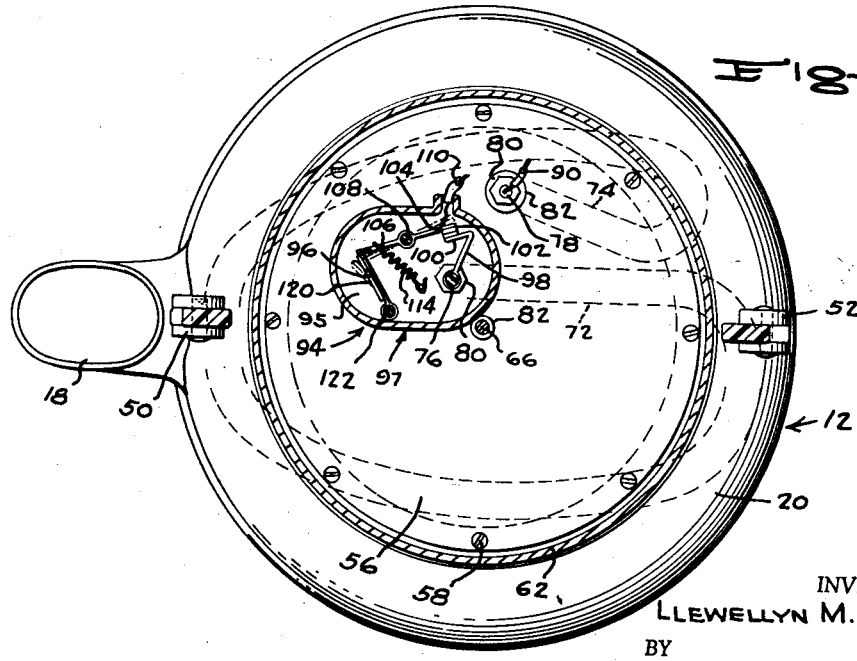

United States Patent Office 2,923,804
Patented Feb. 2, 1960

2,923,804

SAFETY ELECTRIC KETTLE

Llewellyn M. Neuert, Essex, Ontario, Canada

Application April 25, 1958, Serial No. 730,902

3 Claims. (Cl. 219—44)

This invention relates to improvements in electric water-heating kettles of the type having thermostatic control means for shutting off the operating current at desired temperature levels, and more particularly to an improved kettle of this kind wherein the thermostatic control means is housed in the cover structure of the kettle.

The primary object of the invention is to provide a simpler, more practical, and more efficient kettle of the kind indicated above, which is less bulky and unconventional in form and which conforms to the shape and size of an ordinary kettle, and which is safer and more reliable in use.

Another object of the invention is to provide a kettle of the character indicated above, wherein the thermostatic control means, which is housed in the cover structure, is confined within the cover structure and has manual resetting means which projects through the cover structure, and the heating element is mounted on and is suspended from the cover structure, and has an electric cord socket also mounted on the cover structure, the cover structure being removably secured, in closing relation to the body of the kettle, independently of the handle of the kettle, so that upon removal of the cover structure, the control means, the cord socket, and the heating element are together removed as a unit from the kettle body, for repair or replacement.

A further object of the invention is to provide a manually resettable thermostatic control for the kettle which avoids dependence upon accurate and complete return to original shape or condition of a bimetallic arm upon cooling thereof following distortion thereof produced by overheating of the kettle, for reclosing of the contact points separated by heat-warping of the bimetallic arm, and which enables manually resetting the contact points in circuit-closing relation, and in operative relation to the bimetallic arm even though the bimetallic arm may be somewhat warped from its original shape.

A further object of the invention is to provide a hollow cover structure of the character indicated above which has a low silhouette and which is composed of upper and lower separably connected sections, which are readily separable to provide access for repair, adjustment, and replacement of the thermostatic control means, the cord socket, and the heating element, in an easy and less expensive manner.

Other important objects and advantageous features of the invention will be apparent from the following description and the accompanying drawings, wherein, for purposes of illustration only, a specific form of the invention is set forth in detail.

In the drawings:

Figure 1 is a perspective view of a kettle of the invention;

Figure 2 is an enlarged vertical transverse section taken on the line 2—2 of Figure 1;

Figure 3 is a horizontal section taken on the line 3—3 of Figure 2;

Figure 4 is a horizontal section taken on the line 4—4 of Figure 1, showing details of the thermostatic control means; and Figure 5 is a horizontal section, on a reduced scale, taken on the line 5—5 of Figure 2.

Referring in detail to the drawings, wherein like numerals designate like parts throughout the several views, the illustrated kettle, generally designated 10, comprises a hollow cylindrical body 12, having a side wall 14, and a flat bottom wall 16. The side wall 14 is apertured and deformed to provide a pouring spout 18 located intermediate the upper and lower ends of the body 12. The side wall 14 terminates at its upper end in a domed top wall 20 having therein a relatively large centralized opening 22 bounded by a preferably thickened horizontal annular horizontal flange 24.

The kettle further comprises a separable insulated base, generally designated 26, for the kettle body 12, which comprises a flat cylindrical pan-shaped body having a flat bottom wall 28 from whose peripheral edge rises a cylindrical side wall 30 having an upper edge 32. An internal lateral annular flange 34 is fixed on the side wall 30 below its upper edge 32, which serves to support a horizontal divider plate 36 in spaced relation to the base bottom wall 28 and the upper edge 32 of the side wall 30. The divider plate 36 is held in place by bolts 37 traversing and secured to the divider plate 36 and the base between plate 28. The space between the base bottom wall 28 and the divider plate 36 is an insulating space, and is filled with suitable heat-insulating material 38. A central vertical air duct 40 traverses the insulation 38 and opens at its opposite ends through the bottom wall 28 and the divider plate 36.

The space within the base 26 above the divider plate 36 constitutes a socket into which the lower end of a kettle body 12 is to be seated when in operation, in order to insulate the kettle 10 from a surface S upon which the kettle may be supported. The base bottom wall 28 has therein depressions forming feet 42 to engage a supporting surface S and space the base bottom wall 28 above a surface S, in order to provide for free circulation of cooling air across the underside of the base 26, and upwardly through the air duct 40 for cooling the lower end of the kettle body 12 while seated in the base 26. The side wall 14 of the kettle body 12 has thereon an external annular bead or rib 44 to rest upon the upper edge 32 of the base side wall 30 while the kettle body is seated in the base, the rib 44 being spaced above the lower end of the kettle body at a distance such that the bottom wall 16 of the kettle body is spaced above the base divider plate 36 and thereby provide a cooling air chamber 46 therebetween into which the upper end of the air duct 40 opens.

From the foregoing it will be seen that dangerous overheating of the base 26 and of a supporting surface S, in the event that the thermostatic control of the kettle fails to open and the kettle becomes highly heated, is precluded by the hollow and insulated character of the base 26, and by the described circulation of air through and around the base, which prevents dangerous overheating of the base 26.

A suitably shaped bail handle 48 extends across the upper end of the kettle 10, in the transverse plane of the pouring spout 18, and is suitably secured at its ends to diametrically opposed portions of the kettle body top wall as indicated at 50 and 52, respectively.

Closing the opening 22 in the kettle body top wall 20 is a hollow cover structure or assembly, generally designated 54, which comprises a flat lower plate section 56 which is slightly larger in diameter than the opening 22 and bears upon the upper side of the flange 24, with a sealing gasket 25 interposed to which it is removably secured by screws 58 spaced therearound. The lower plate section 56 has a central cross sectional enlargement 60 on its underside.

The cover assembly 54 further comprises a dished concave-convex upper plate section 62, which is somewhat larger in diameter than the lower plate section 56, and concentrically overlies the section 56, and has a peripheral edge 64 which conformably bears upon the upper side of the kettle body top wall 20 around the lower plate section 56. The upper plate section 62 is secured removably in place by a single central screw 66 which traverses the upper section 62 and is threaded into the enlargement 60 of the lower section 56.

Carried by and depending from the cover assembly 54 is a Calrod heating element 68 comprising a horizontal loop 70 disposed parallel to and closely spaced above the kettle body bottom wall and vertical laterally spaced legs 72 and 74 which traverse and are secured to the lower plate section 56 of the cover assembly, at one side of the center thereof. The leg 72 has an upper end 76 which passes through the lower section 56 close to the center thereof, and the leg 74 has an upper end 78 which similarly traverses the lower section 56 at a point spaced laterally outwardly from the leg and 76. The Calrod heating element leg ends 76 and 78 are suitably secured in place and electrically insulated from the lower section 56, as by nuts 80 threaded thereon in conjunction with insulating grommets 82.

A preferably oblong insulated electrical cord socket body 84 is engaged in and suitably secured in a conforming opening 86 provided in the upper cover assembly section 62 over the heating element leg ends 76 and 78, and the leg end 78 is electrically connected to one of the electric cord plug blade receiving socket elements 88 by a wire 90.

The thermostatic control, generally designated 94, as shown in Figure 4, comprises an oval bottom wall 95 from which rises an insulated side wall 96 which reaches between and is suitably secured to the lower and upper cover assembly sections 56 and 62, so as to form a closed cup-shaped housing 97 which is located forwardly of the center of the cover assembly and at the same side as the socket body 84, and into which the upper end 76 of the heating element leg 72 extends. The mechanism of the control 94 comprises a stationary conductive arm 98, which is suitably fixed on and projects laterally from the heating leg end 76 and terminates in an angled arm 100 on whose outward side is fixed contact point 102.

Opposing the fixed contact point 102 is a movable contact point 104 on the adjacent end of a non-conductive straight rock arm 106 which is pivotally mounted at a point intermediate its ends, as indicated at 108, on the bottom wall 95 of the housing 97. A flexible wire 110 leads from the movable contact point 104 to the remaining socket element 112 of the socket body 84. The rock arm 106 is biased toward an open or counterclockwise position, as seen in Figure 4, in which the contact point 104 is disengaged from the contact point 102 and the heating circuit broken, by a spring 114 which is stretched between the housing bottom plate 95 and the arm 106 at a point to the left of the pivot 108. The left-hand end of the rock arm 106 has thereon an upstanding lug 116.

Normally engaging the lug 116 and thereby holding the spring-biased rock arm 106 in a clockwise circuit-closing position, is the free end 118 of an elongated bimetallic thermostatic arm 120, which is fixedly mounted on the housing bottom wall 95, as indicated at 122. The bimetallic arm 120 is arranged so that, upon being subjected to a predetermined degree of heat, as when the kettle body 12 becomes overheated by the heating element 68, for any reason, such as exhaustion of water therefrom, the arm 120 becomes curled and warped and disengages its free end 118 from the rock arm 106, so that the rock arm 106 is freed to be moved to circuit-opening position by the spring 114, whereby the heating element 68 is deenergized.

The upper end of the lug 116 on the rock arm 106 projects upwardly through a slot 122 provided in the cover assembly upper section, so that it is accessible for the purpose of manually resetting the rock arm 106 in its open position in engagement with the free end 118 of the bimetallic arm 120, against the resistance of the spring 114, once the overheated condition of the kettle has subsided and the arm 120 has returned partially or fully to its normal straight shape and right-angular relation to the rock arm 106, due to cooling thereof.

From the foregoing it will be apparent that when anything goes wrong with the electrical components of the kettle, and repair, adjustment, or replacement of any of them is necessary or desirable, they can be reached and worked upon simply by backing out the screw and then removing the upper plate section of the cover assembly. The heating element can be reached for replacement by backing out the screws and removing the lower plate section of the cover assembly, and substituting another heating element on the lower section, or replacing the lower section and the heating element as a unit.

Although I have shown and described herein a specific form of the invention, it is to be understood that any change or changes in the structure and in the relative arrangements of the components are contemplated as being within the spirit and scope of the invention as defined by the claims appended hereto.

What is claimed is:

1. A safety electric kettle comprising a kettle body having a bottom wall, a side wall, and means on said side wall defining an open upper end on the body, a cover assembly mounted on and closing the open end of the body, said cover assembly comprising a lower plate extending across said open end, first means securing said lower plate in place, an upper plate overlying and coextensive with said lower plate, said upper plate having a central portion spaced upwardly from said lower plate and a peripheral portion bearing upon the kettle body around the upper plate, said lower and upper plates defining a closed chamber therebetween, second means engaged with the lower plate and securing the upper plate in place, a heating element within the kettle body and extending to said lower plate, and a thermostatic control mounted in said chamber and electrically connected to the heating element.

2. A safety electric kettle comprising a kettle body having a bottom wall, a side wall, and means on said side wall defining an open upper end on the body, a cover assembly mounted on and closing the open end of the body, said cover assembly comprising a lower plate extending across said open end, first means securing said lower plate in place, an upper plate overlying and coextensive with said lower plate, said upper plate having a central portion spaced upwardly from said lower plate and a peripheral portion bearing upon the kettle body around the upper plate, said lower and upper plates defining a closed chamber therebetween, second means engaged with the lower plate and securing the upper plate in place, a heating element within the kettle body and extending to said lower plate, and a thermostatic control mounted in said chamber and electrically connected to the heating element, comprising contact means including a pivoted and spring-biased horizontal rock arm, a horizontal bimetallic thermostat arm normally engaged with and holding said rock arm in circuit opening position, and adapted, when heated, to release said rock arm to circuit closing position, and an upstanding manual reset lug fixed on said rock arm, said upper plate having an opening through which said lug rises.

3. A safety electric kettle comprising a kettle body having a bottom wall, a side wall, and means on said side wall defining an open upper end on the body, a cover assembly mounted on and closing the open end of the body, said cover assembly comprising a lower plate extending across said open end, first means securing said lower plate in place, an upper plate overlying and coextensive with said lower plate, said upper plate having a central portion spaced upwardly from said lower plate and a peripheral portion bearing upon the kettle body around the upper plate, said lower and upper plates defining a closed chamber therebetween, second means engaged with the lower plate and securing the upper plate in place, a heating element within the kettle body and extending to said lower plate, and a thermostatic control mounted in said chamber and electrically connected to the heating element, comprising contact means including a pivoted and spring-biased horizontal rock arm, a horizontal bimetallic thermostat arm normally engaged with and holding said rock arm in circuit opening position, and adapted, when heated, to release said rock arm to circuit closing position, and an upstanding manual reset lug fixed on said rock arm, said upper plate having an opening through which said lug rises, said heating element having upstanding first and second legs securably traversing and insulated from said lower plate, said first leg being connected to the contact means, and an electric cord socket mounted on the upper plate having terminals severally connected to said second leg and the thermostat arm.

References Cited in the file of this patent

UNITED STATES PATENTS

| | | | |
|---|---|---|---|
| 1,022,438 | Nelson | Apr. 9, | 1912 |
| 1,292,977 | Wilson | Jan. 28, | 1919 |
| 1,727,066 | Kasten | Sept. 3, | 1929 |
| 1,914,529 | Rich | June 20, | 1933 |
| 2,112,336 | Duvall | Mar. 29, | 1938 |
| 2,274,930 | Newton | Mar. 3, | 1942 |
| 2,471,260 | Chapman | May 24, | 1949 |
| 2,478,541 | McCracken | Aug. 9, | 1949 |
| 2,509,008 | McFarland | May 23, | 1950 |
| 2,519,431 | Brown | Aug. 22, | 1950 |
| 2,519,433 | Brown | Aug. 22, | 1950 |
| 2,599,941 | Rickles | June 10, | 1952 |